March 31, 1964     L. J. WUBBE     3,126,568

WINDSHIELD WIPER ARM PIVOT JOINT

Filed June 15, 1961

INVENTOR.
LEO J. WUBBE
BY
ATTORNEY

United States Patent Office 3,126,568
Patented Mar. 31, 1964

3,126,568
WINDSHIELD WIPER ARM PIVOT JOINT
Leo J. Wubbe, Beverly Shores, Ind., assignor to The Anderson Company, a corporation of Indiana
Filed June 15, 1961, Ser. No. 117,359
1 Claim. (Cl. 15—250.35)

This invention relates generally to windshield wiper equipment and is particularly concerned with providing an improved pivot joint between elements of a windshield wiper arm.

The pivot means embodied in this disclosure is designed and constructed to stabilize relative movement between the sections of a windshield wiper arm or between one of the sections and the superstructure of a windshield wiping blade. In the past, the usual connection between various elements comprising the wiping units has been an elongate rivet having a shank which extends transversely through one section and having its outer or free ends disposed in a channel-like outer section. The ends of such rivets are most often upset to define a holding connection with the outer sections. The shanks of such rivets are usually relatively small in diameter and after the wiper has been subjected to hard usage, the material through which openings are defined and through which the pin extends will begin to wear away due to the relatively high pressures on their bearing surfaces. Once the original holes in the channel are enlarged, fast and excessive wear results due to the momentum developed by the slack therein with the result that the connection often becomes so loose as to be unable to maintain the elements in proper wiping relationship. Also, the upset end of the rivet is unsightly and does not harmonize with the arm to which it is attached.

The primary object of this invention is to provide an improved pivot joint.

Another object of this invention is to provide an improved pivot for use between sections of an arm of a windshield wiper or for use between the arm and wiping blade.

Another object of this invention is to provide an improved pivot joint having an expansible sleeve forming an improved pivotal arrangement.

Another object of this invention is to provide an expansible sleeve adapted upon assembly with a pin to expand at its ends into pressed contact with other elements of the assembly thus forming an improved pivot joint.

Other objects and advantages of the invention will become apparent after the description hereinafter set forth is considered in conjunction with the drawings annexed hereto.

Figure 1:
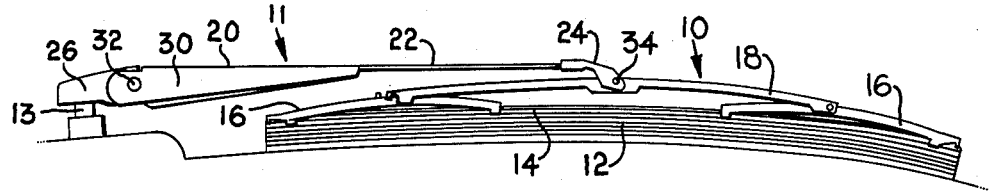
FIGURE 1 is a side elevation of a windshield wiper arm-and-blade assembly embodying my invention.

In FIGURE 1 where the structure of a wiper unit is generally disclosed, it is to be noted that the wiping blade is designated generally by the numeral 10 which is supported for operative movement on the end of an arm 11 to which it is connected through a connector 24. The arm 11 is operatively connected to a drive shaft 13 at its other end.

The wiping blade 10 consists of an elongate wiping element 12 supported from a flexor 14 which permits movement in a direction perpendicular to a surface being wiped but resists movement parallel thereto. A superstructure is operatively attached to the flexor at spaced-apart points. This superstructure is comprised of a primary yoke 18 which is pivotally attached at each outer end to a pair of secondary yokes which in turn are directly connected to the flexor. The primary yoke 18 has a connector 24 fixed thereto near its mid-point adapted to receive the end of an elongate extension 22 of windshield wiper arm 11. It can be seen that pressure applied from arm 11 will be transmitted through the superstructure to the blade element 12.

The oscillating arm 11 is comprised of an inner end, remote from extension 22, defined by a pair of generally parallel side portions 30 depending from a back portion 20. An extension 22 of flat bar stock is rigidly supported at one end from this inner end and is pivotally attached at its other end to the primary yoke 18 for support of the wiper element. A head member 26 is pivotally attached to arm 11 and is adapted to be received on an oscillating drive shaft 13.

Figure 2:
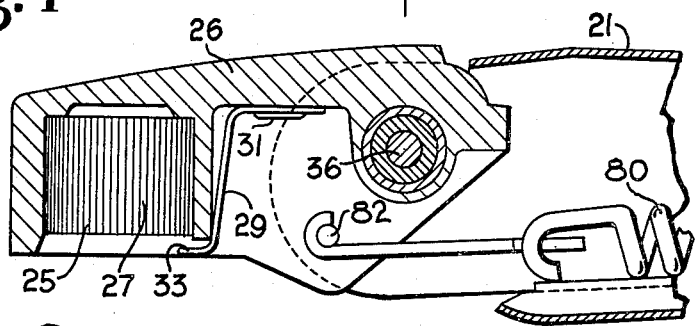
FIGURE 2 is a greatly enlarged cross-sectional view taken longitudinally through the head section.

Head member 26, most clearly shown in the cross-sectional view of FIGURE 2, is provided with a recess 25 having peripherally spaced splines 27 defining means for receiving and clutching a splined drumhead (not shown) at the end of shaft 13. A spring clip 29, anchored to the underneath portion of head 26 by a deformed finger portion 31, extends downwardly and terminates in an in-turned end 33 which projects over recess 25 for operative engagement underneath the splined drumhead to connect the head member thereon. Head 26 is provided with a transverse opening having a cylindrical bushing 40 pressed therein having a bearing surface on its inside diameter. It is from this bushing that a pivot is provided between head 26 and arm 11. It can be noted in FIGURE 2 that a spring is anchored between the head and arm to bias the arm toward a windshield to be wiped.

The specific elements defining the improved pivot between head 26 and arm 11 is the subject of the following description.

Figure 4:
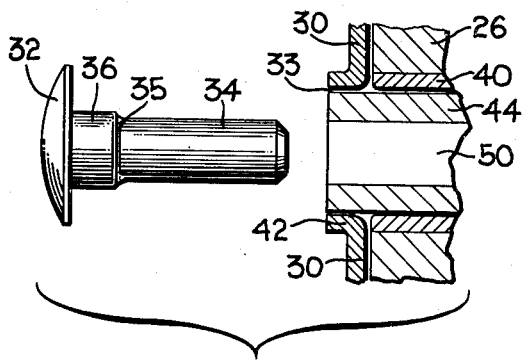
FIGURE 4 is a greatly enlarged showing of the elements forming the pivot joint in position prior to assembly of the pin therein.
Figure 5:
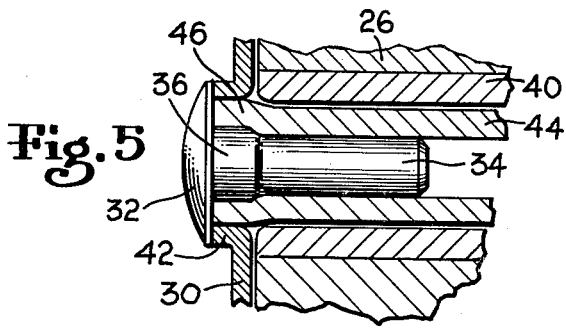
FIGURE 5 is a greatly enlarged cross-sectional view showing the elements in assembled position after insertion of the pin.

As best shown in FIGURES 4 and 5, depending side walls 30 of arm 11 are provided with a pair of aligned openings 33 further defined by an outwardly extruded portion 42. Upon assembly of head 26 within side walls 30, prior to the insertion of a rivet or pin as shown in FIGURE 4, it is to be noted that the inside diameters of openings 33 and bushing 40 are substantially the same and aligned. A cylindrical sleeve 44 having a cylindrical opening 50 is inserted through the bushing 40 in close relationship therein thus forming a pivotal bearing arrangement. Sleeve 44 extends axially beyond the end or face of head 26 and bushing 40 and terminates flush with the outer end of extruded portion 42. It can be seen that substantially the same space is provided between extruded portion 42 and sleeve 44 as between bushing 40 and sleeve 44.

Figure 3:
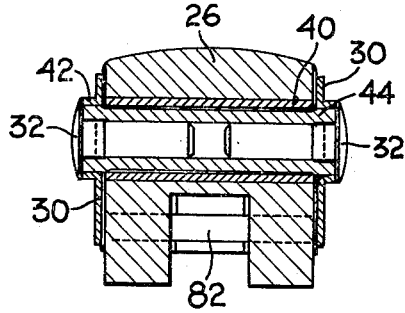
FIGURE 3 is a sectional view taken along line 3—3 of FIGURE 2.

A pin 32 having an enlarged round head is provided with a cylindrical shank portion 34. It is to be noted that shank 34 is of a size to be snugly received within opening 50 of sleeve 44, but not causing a substantial increase in outside diameter of sleeve 44. However, shank 34 contains an enlarged portion 36 underneath and adjacent the round head which is of a diameter larger than the inside diameter of opening 50, and which when driven into the end of opening 50 will cause sleeve 44 to expand radially at its outer end. Enlarged portion 36 has an axial dimension substantially equal to the axial dimension of extrusion 42, and is connected with shank portion 34 by a taper portion 35. FIGURE 3 discloses that pins are driven into opening 50 of sleeve 44 from opposite ends thereof to maintain the elements in operative position.

The effect of driving or forcing a pin 32 into a sleeve opening which is smaller in diameter than a portion 36 underneath the pin head will be to expand the end 46 of sleeve 44. As most clearly shown in FIGURE 5, where the pin has been inserted into sleeve 44 until the head is adjacent the end of extrusions 42, end 46 of sleeve 44 is expanded or swaged outwardly into pressed contact with extruded extension 42 thereby preventing any relative axial or rotary movement between sleeve 44 and side walls 30. It will be readily apparent that firm contact in fixed relation will be maintained between areas 42 and 46 and between 36 and 46. Wear will not develop mainly because the parts are in fixed mating relation defining a firm slack-free pressed connection. Inasmuch as the central portion of sleeve 44 has not been expanded due to the insertion of shank 34, a broad pivotal bearing surface is still maintained between sleeve 44 and bushing 40. This constitutes a relatively low pressure per unit area with a resulting decrease in wear. Corners of bushings 40 may be slightly rounded at their extremities to conform with bushing 44 adjacent swaged enlargement 46.

It can be seen that by so swaging or expanding the end of sleeve 44 radially into firm contact with the inside diameter of extrusion 42, a firm and rigid connection is made therewith and that no relative rotary or axial movement will be permitted therebetween. It can be seen that the contacting area between 42 and 46 is broader than could possibly be obtained between sleeve 44 and the rather thin edge of flange 30. The broad contacting surfaces being urged together will prevent initial wear from starting due to any looseness or play between the mating parts. This is an inherent problem developed by the constantly changing forces due to the oscillatory motion of the windshield wiper arm.

Sleeve 44 not being expanded in the area intermediate its ends retains its freely pivotal bearing relationship with bushing 40 thereby providing a broad bearing surface having relatively low pressure thereon.

With the means disclosed above, I have invented an improved pivot joint for use between the head and arm sections of a windshield wiper arm. The arrangement permits longer wear without the disadvantage of a loose connection developing between pivotal parts. The same principle can be applied to the connection between the end of an arm and the superstructure of the wiper blade.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

Windshield wiper structure comprising a head member for operative connection to an oscillating drive shaft, said head member provided with spaced-apart substantially parallel outer wall surfaces having a cylindrical bushing normally disposed between said surfaces, an arm member adapted for pivotal connection to said head member, said arm member having a pair of depending substantially parallel side walls provided with aligned transverse apertures therethrough, said parallel depending side walls of the second member positioned astride the head member and having offset tubular formations axially aligned with said cylindrical bushing, an elongate cylindrical sleeve pivotally received within the bushing and having ends projecting into said formations of said side walls, means received in each end of said sleeve for uniting the sleeve with said walls, each of said means having an inner cylindrical portion adapted to be freely axially received within said sleeve and having a radially enlarged surface at its outer end adapted to be forcibly axially received within a respective outer end of said sleeve to radially expand said sleeve at its outer end into fixed mating contact with a formation thereby defining a pivotal connection between the elongate cylindrical sleeve of said arm member and the cylindrical bushing of said head member.

References Cited in the file of this patent

UNITED STATES PATENTS

| | | |
|---|---|---|
| 2,280,502 | Stenger | Apr. 21, 1942 |
| 2,384,321 | Less | Sept. 4, 1945 |
| 2,774,098 | Tieri | Dec. 18, 1956 |
| 2,850,755 | Diebel | Sept. 9, 1958 |
| 2,974,558 | Hodell | Mar. 14, 1961 |

FOREIGN PATENTS

| | | |
|---|---|---|
| 388,131 | Great Britain | Feb. 23, 1933 |